July 23, 1963
D. M. WILLYOUNG
3,098,941
DYNAMOELECTRIC MACHINE WINDING WITH EDGE-STANDING
FLUID-COOLED CONDUCTORS
Filed Oct. 27, 1960
3 Sheets-Sheet 1
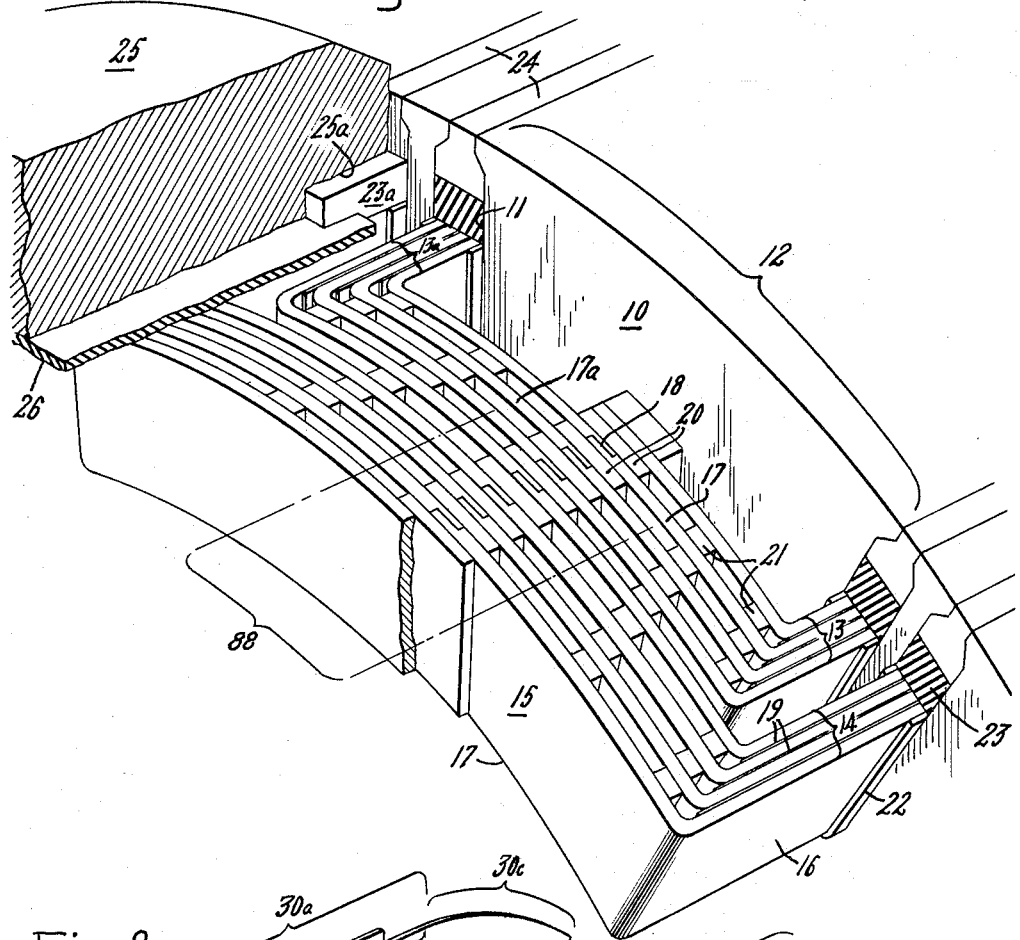
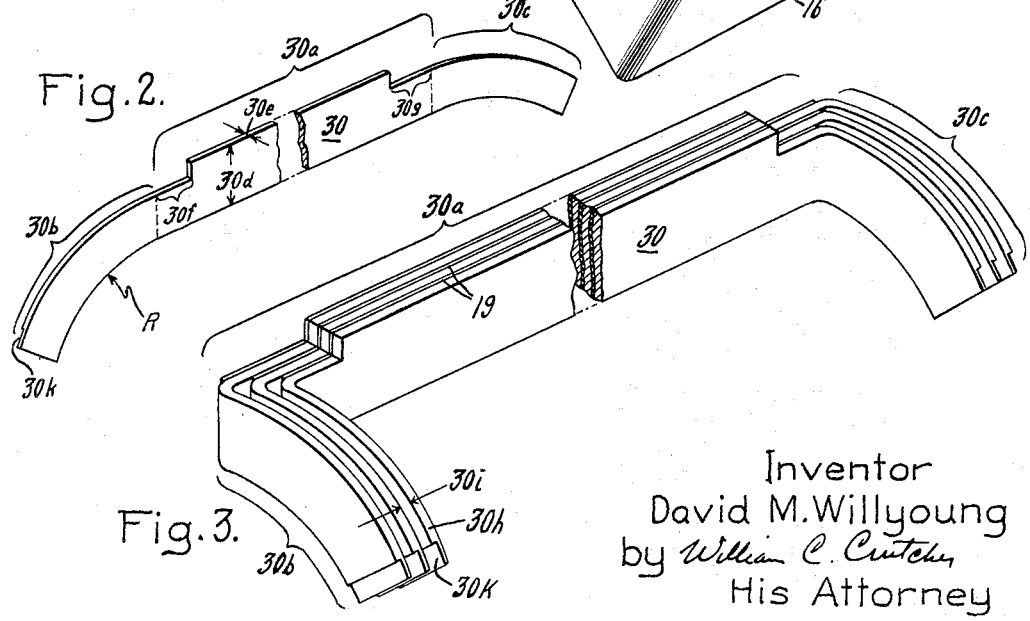
Inventor
David M. Willyoung
by William C. Crutcher
His Attorney

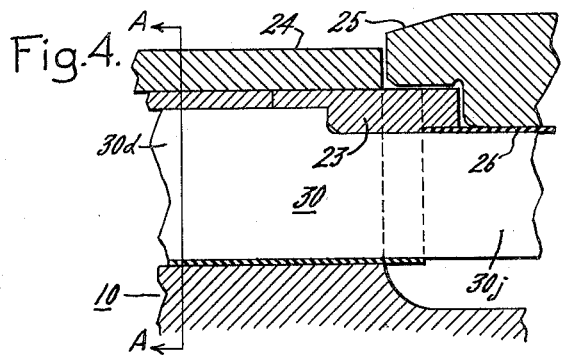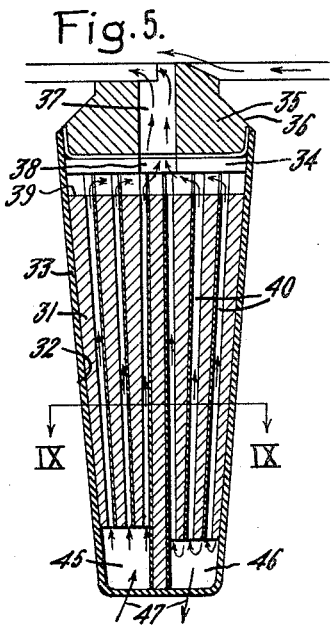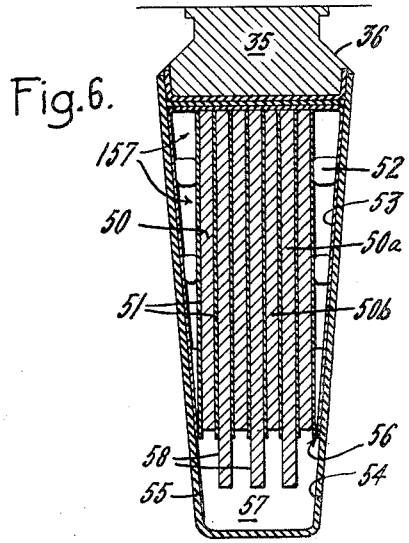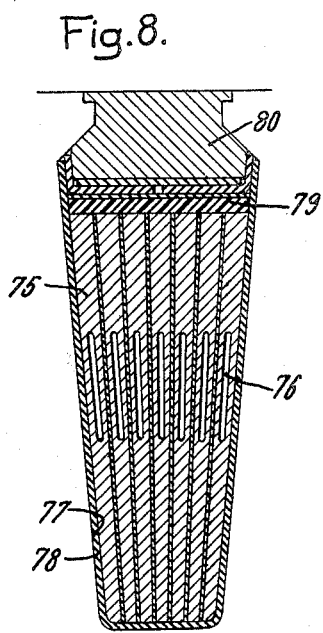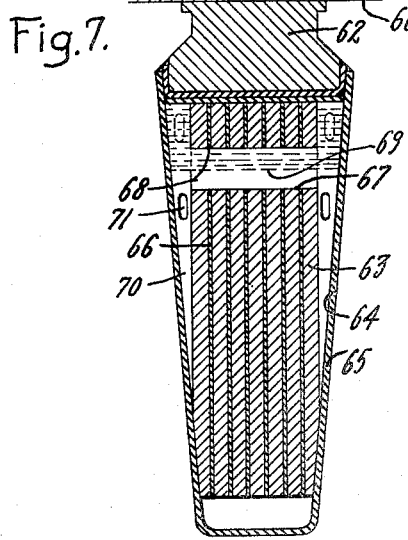

July 23, 1963
D. M. WILLYOUNG
3,098,941
DYNAMOELECTRIC MACHINE WINDING WITH EDGE-STANDING
FLUID-COOLED CONDUCTORS
Filed Oct. 27, 1960
3 Sheets-Sheet 3
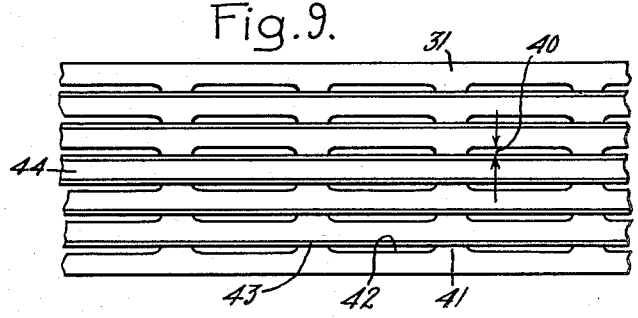
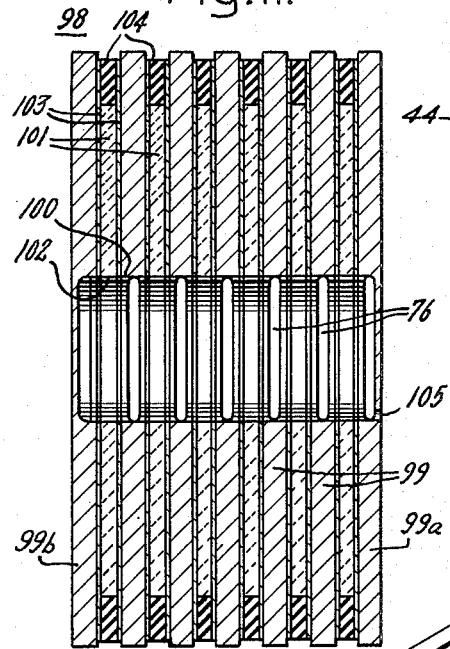
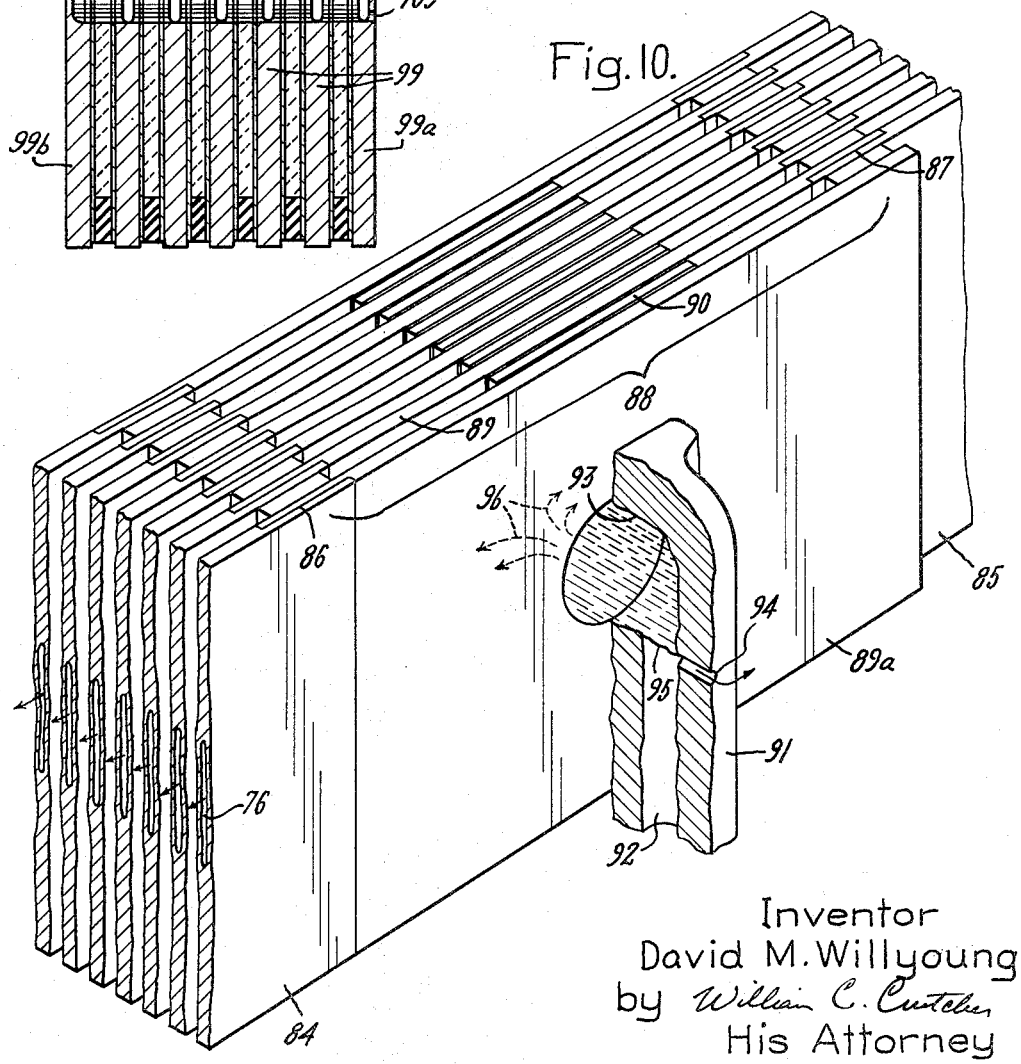
Inventor
David M. Willyoung
by William C. Crutcher
His Attorney

United States Patent Office 3,098,941
Patented July 23, 1963

3,098,941
DYNAMOELECTRIC MACHINE WINDING WITH EDGE-STANDING FLUID-COOLED CONDUCTORS
David M. Willyoung, Scotia, N.Y., assignor to General Electric Company, a corporation of New York
Filed Oct. 27, 1960, Ser. No. 65,404
17 Claims. (Cl. 310—262)

This invention relates to an improved type of winding for a dynamoelectric machine with provisions suitable for cooling the winding with a gas or a liquid, and more particularly it relates to a rotor winding wherein each separate conductor thereof has an elongated cross-section and is disposed edgewise in the rotor winding slot.

The usual winding construction for a rotor of a large dynamoelectric machine, such as the field winding for a generator rotor consists of coils which are radially stacked one above the other in the longitudinal winding slots of the rotor. It is known that the capability of such a machine may be increased by causing cooling conduits to be arranged inside the main slot insulation and in heat exchange relationship with the winding conductors, in order that a fluid coolant, usually hydrogen, will carry off heat generated in the windings. These coolant passages may be defined by grids inserted in the slots (see U.S. Patent No. 2,664,512, issued December 29, 1953, to E. D. Huntley or U.S. Patent No. 2,791,707, issued May 7, 1957, to D. M. Willyoung). Other arrangements include conduits defined by the conductors themselves as more specifically disclosed in U.S. Patent No. 2,661,434, issued December 1, 1953, to C. E. Kilbourne, or as disclosed in U.S. Patent 2,986,664 issued to David M. Willyoung and Peter A. Becker on May 30, 1961. All of the above-mentioned patents are assigned to the assignee of the present application.

Placing the conductors in radially stacked relationship causes difficulties in providing for flow paths of the coolant from one radial layer to another. In order to promote uniform cooling and to reduce the effects of differential thermal expansion and contraction between different strands, it is desirable that an entering coolant be exposed to as much surface area as possible of the lightly insulated conductors. In previous constructions, with the conductors lying in radially stacked relationship, the greatest surface area of each separate conductor lies primarily in a plane normal to a radial line. This means that a coolant flowing along the slot alongside the stack, either in grids or in longitudinal grooves in the conductors, is only exposed to the sides of the conductors. Where internal coolant passages are provided for the coolant to flow lengthwise, by means of extruded cross-sections or channel-shaped conductors, difficulty is encountered in distributing the proper amounts of coolant to each radial layer for uniform cooling.

Equalization and distribution of heat between turns can also be accomplished by thinner turn insulation or conversely by greater surface-to-surface contact area. However, the turn insulation thickness in radially stacked windings is chosen more to resist crushing from centrifugal force than for its dielectric ability. Surface-to-surface contact area is limited by the conductor width, which in turn is limited to the slot width.

Additional difficulties are encountered in liquid-cooled rotors due to the centrifugal force on the liquid. Transition from one radial position to the next always entails a substantial pressure drop with a possibility of local leakage. Restricting the liquid to a specific radial location to reduce pressure differentials, while at the same time providing for cooling conductors located at different radial positions in the slot, is difficult with radially stacked conductors by the inherent nature of the arrangement.

The difficulties of proper exposure of the conductors due to cooling fluid is also encountered in the end turns. In an effort to increase the surface area available for cooling, grids have been attached to radially stacked end turns as disclosed in U.S. Patent No. 2,904,708, issued to D. M. Willyoung on September 15, 1959. Use of such grids is beneficial where the edges of the radially stacked end turns are the only exposed portions due to the radial stacking of the conductors.

Another difficulty encountered in the larger rotors is the limitation of rotor diameter and/of material in the end turns due to the stresses imposed on the retaining ring used to hold the end turns in place against centrifugal force. Although the weight of the end turns can be lessened by reducing the width of the circumferentially lying portions of the end turns, it is not practical to substantially reduce the thickness of radially stacked end turn conductors where it could be most effective (thus reducing both the weight of material and the radius of rotation).

The usual procedure for winding a generator rotor is either to feed a continuous conductor into a pair of slots disposed on either side of the rotor pole portion, this continuous conductor having preformed bends where the longitudinal or axial portion of the coil makes the transition to a circumferential portion; or to use a built-up construction where the longitudinal portions of the coil are placed in the slot starting at the bottom of the slot and are later connected to circumferentially extending portions at the ends of the rotor body. This latter method is sometimes used where internal direct-cooling conduits are used.

Accordingly, one object of the present invention is to provide an improved rotor winding construction which allows ease of assembly over previous constructions.

Another object of the invention is to provide a rotor winding for a dynamoelectric machine which simplifies and facilitates cooling the windings with either a gas or liquid.

Another object of the invention is to provide an improved rotor winding which reduces stresses on the end winding retaining rings.

Another object is to provide a construction allowing greater surface-to-surface contact area between turns so as to promote temperature equalization in the slot.

Another object is to provide a rotor winding which reduces pressure differentials when cooling with a liquid.

Another object is to provide a simplified cooling arrangement for a rotor winding which provides a greater surface area for cooling both the end turn portions and the slot-lying portions of the winding with either a gas or a liquid.

Another object is to provide a construction using thinner turn insulation so as to promote temperature equalization between turns.

Still another object is to provide a simplified construction for a rotor winding, which construction is suitable for either liquid or gas-cooled windings.

A more specific object of the invention is to provide an edge-standing rotor winding which is easily assembled, which provides exposure of the coolant fluid to all of the conductors in any given slot at a specific radial location in the slot, and which allows for the reduction of stresses in the end turn retaining rings.

The subject matter which I regard as my invention is particularly pointed out and distinctly claimed in the concluding portion of this specification. My invention, however, both as to organization and method of practice, together with further objects and advantages thereof, may best be understood by reference to the following description, taken in connection with the accompanying drawings in which:

FIG. 1 is a perspective view of a portion of the end of a rotor body showing the end turns of the inner two coils;

FIG. 2 is a perspective view of a single conductor illustrating one step in producing the rotor winding;

FIG. 3 is likewise a perspective view illustrating a further step in forming the winding and particularly illustrating one-half of a rotor coil;

FIG. 4 is a detailed view in section of the portion of the rotor where the coils emerge from the slots, showing a portion of the retaining ring;

FIGS. 5–8 are enlarged cross-sections taken through a winding slot of the rotor as indicated by arrows A—A of FIG. 4 and illustrating modifications for both gas and liquid cooling;

FIG. 9 is a view looking in a radial direction inward on the winding of one modification as indicated as arrows IX—IX in FIG. 5;

FIG. 10 is a perspective view of a liquid-cooled manifold arrangement suitable for supplying a coil such as shown in FIG. 8; and FIG. 11 is a cross-section view of a suitable discharge manifold intended for use with the liquid-cooled coil shown in FIGS. 8 and 10.

Generally stated, the invention is practiced by providing a group of edge-standing conductors, integrally bonded with alternate layers of strand insulation for insertion as a unit in one winding slot of the rotor, and having circumferentially extending edge-standing end portions adapted for joining either to a liquid manifold or to similar circumferentially extending portions of another similarly bonded group of edge-standing conductors to form a complete coil. The radial dimension (width) of the conductors is greater than the circumferential dimension of the slot and the conductor width to thickness ratio is preferably at least 4 to 1. The cross-section of the end turns may be reduced in a radial direction to provide lower retaining ring stresses for a given rotor. Suitable cooling conduits at a specific radial location provide for access of the coolant fluid to every conductor in the slot.

Referring now to FIG. 1 of the drawing, a perspective view of the end turn portion is illustrated for a rotor employing gas-cooled windings, although the general arrangement is applicable also to liquid-cooled windings. There the end of the central body portion of a generator rotor 10 is shown to define longitudinal radially disposed winding slots 11 on either side of the magnetic pole portion 12 of the rotor. Shown emerging from winding slots 11 are portions of two coil halves 13, 14 lying closest to the pole portion 12 and comprising edge-standing conductors 15. Conductors 15 are connected in series to form continuous coils about the magnetic pole portion 12. Each conductor 15 comprises an axially extending portion 16 and a circumferentially extending portion 17, the latter being joined to a similar circumferentially extending portion 17a from the mating coil half 13a near the center-line of the coil by a lapped and brazed joint 18.

The axially extending portions 16 of the conductors are separated by turn insulation 19 in the form of flat sheets which need only withstand turn-to-turn potential. The portions 16 are bonded to turn insulation 19 so that the coil halves 13, 14 for a given slot 11 are handled and inserted as an integral unit.

The circumferentially extending portions 17 of the conductors are separated by insulating blocks 20, 21 which space the conductors for insulating purposes and for proper cooling of the end turns.

The axially extending portions of coils 13, 14 are insulated from the body 10 of the rotor by heavy slot insulation 22 and by insulating creepage blocks 23 which separate the tops of coils 13, 14 from slot wedges 24. The creepage blocks 23 extend beyond the end of the rotor body 10 as indicated at 23a, but portions 23a are removed from the remainder of FIG. 1 for the purpose of showing the arrangement of the conductors.

A retaining ring 25 serves to hold the end turns in place. The retaining ring 25 is one of the most highly stressed parts of the rotor due to the centrifugal force exerted by the end turns and due to its own weight. A circumferential groove 25a receives the ends of creepage blocks 23 and the retaining ring 25 is insulated from the end turns by a circumferentially extending sheet of insulation 26.

Although the arrangement of FIG. 1 is for gas-cooled windings, only slight modification, later to be described, makes the arrangement equally suitable for liquid-cooled windings.

FIGS. 2 and 3 also apply both to gas and liquid-cooled windings by using special cross-sections on the conductors, however, they are illustrated here as solid conductor bars of rectangular cross-section. Referring to FIG. 2, a conductor bar, shown generally as 30, is of such length as to include both the axially extending portion 30a of the conductor and what will later be the circumferentially extending portions 30b, 30c of the conductor. Portions 30b, 30c are bent in the plane of the conductor 30 on an arc having a radius R equal to the desired distance of the radially innermost portions of the end turns from the rotor axis. It will be apparent that the width 30d of the conductor is substantially greater than thickness 30e of the conductor, the minimum width-to-thickness ratio being on the order of 4 to 1 in the case of a low voltage high amperage winding having only one edge-standing conductor per slot and ranging as high as 450 to 1 or higher where a large number of edge-standing conductors are employed per slot.

Although the minimum practical width-to-thickness ratio would be on the order of 4 to 1, this would apply where there is only one conductor per slot. Practical considerations dictate at least 4 or more conductors per slot to lower the current carried. Therefore, the practical minimum width-to-thickness ratio would be on the order of 10 to 1. This gives a greatly elongated cross-section and the greatest transverse dimension (or width) of the conductor would be much greater than the least transverse dimension (or width) of the slot.

In keeping with one object of the invention, the circumferentially extending portions 30b, 30c and the axially extending portions shown by brackets 30f, 30g of the exposed end turns are of reduced width in order to reduce the stresses imposed on the retaining ring. It is understood that the term "width" here refers to the conductor bar per se and that dimension 30d will extend in a radial direction after the winding is assembled in the rotor. This distinction must be clearly understood since in the usual construction the "width" of the conductor is parallel to the "width" of the slot, whereas with my improved construction, the "width" of the conductor lies normal to the "width" of the slot.

FIG. 3 illustrates two additional steps in making my improved winding. First, sheets of turn insulation 19 which are cut to conform to the varying width of the conductors 30 are coated with a suitable adhesive or bonding agent such as a curable epoxy resin. Next, the conductors 30 and flat sheets of turn insulation 19 are alternately stacked and subjected to a pressing operation, with or without heat as necessary to activate the bonding adhesive, so that the conductors for one slot are bonded into a solid integral unit.

A suitable material for the sheets of turn insulation 19 would be sheets of laminated plastic such as Textolite, although other equivalent materials will occur to those skilled in the art. It will also be noted at this point that the sidewise bending as indicated at arcs of radius R could also be performed after the conductors have been bonded to the turn insulation, rather than on separate conductors as was indicated by FIG. 2.

The next step, as illustrated in FIG. 3, is that of bending the circumferentially extending portions 30b, 30c at right angles to the axially extending portions 30a. This is preferably done by bending each individual conductor, starting with the innermost conductor 30h so as to leave a spacing 30i between the individual conductors. It will be appreciated, of course, that conductor bars 30 must initially be cut to varying lengths so that the ends of the bars will be properly aligned after bending. It should also be noted that the ends of the conductors are cut away as indicated at 30k to allow for a lapped joint such as 18 in FIG. 1.

The result of the foregoing is an integral C-shaped package suitable for a coil half 13, 14 and which may be radially inserted into the winding slot of the rotor body and wedged in place. The circumferentially extending portions 30b, 30c will have the proper curvature for joining either to similar end turn portions of another conductor package in a slot on the other side of the rotor pole portion or to a liquid manifold, preferably on the coil centerline, if individual liquid conductor cooling is desired.

Referring to FIG. 4 of the drawing, the purpose of the decreased width (radial dimension) of the conductor bars will be apparent. There conductors 30 have a normal width portion 30d and a reduced width portion 30j. The creepage block 23 at the end of the slot (see FIG. 1) is properly contoured to receive this transition in conductor width. Thus the portion of the conductor of normal width 30d is held in place in the slots by slot wedges 24, whereas the reduced width portion 30j continues both axially and circumferentially to be held in place by the retaining ring 25. This arrangement allows both the radius and the cross-section (mass) of the end turns to be substantially reduced, both of which reduce stresses in the retaining ring 25.

A cross-section of the rotor winding slot taken in the direction of the arrows A—A on FIG. 4 will illustrate various modifications of the conductor cross-section and arrangement of the conductors in the slots as illustrated in FIGS. 5-8. Although FIG. 1 illustrates a winding having only four conductors per slot, FIGS. 5-8 illustrate seven conductors per slot. The number selected depends on the desired voltage and field current and is not material. FIGS. 5 and 6 illustrate arrangements for gas-cooled rotors, whereas FIGS. 7 and 8 illustrate arrangements for liquid-cooled rotors.

Referring first to FIG. 5, and also to FIG. 9 which is a section taken along lines IX—IX of FIG. 5, the edge-standing conductors 31 are shown disposed in a tapered slot 32 and are insulated from the rotor by a U-shaped piece of heavy slot insulation 33 and by a creepage block 34. A slot wedge 35 retaining the windings in the slot by means of dovetails 36 defines a port 37 which is intended to be symbolic of either an intake or a discharge port or a rotor of the "gap pickup" type, although it is shown here as a discharge port. Such a rotor is disclosed in U.S. Patent No. 2,702,870, issued on February 22, 1955, to Rollin H. Norris and assigned to the assignee of the present application. This arrangement contemplates alternate pickup and discharge zones in the air gap between the rotor and the stator. It should be noted that conductors 31 have an elongated tapered cross-section so as to completely fill the slot. This arrangement necessitates that the half coils be made in three sections, to avoid interference with the dovetails 36 when inserting radially into the slot. Each separate section may be bonded as described.

Creepage block 34 defines a port 38 aligned with port 37. A transverse groove 39 milled or otherwise formed in the tops of conductors 31 extends all the way across the slot thus affording communication with all conductors equally and this groove 39 communicates with the air gap by means of ports 37, 38. The groove 39 is fed by a plurality of coolant passages 40 extending along the entire radial face of each conductor and in intimate thermal contact therewith.

Reference to FIG. 9 will illustrate the manner in which cooling conduits 40 are arranged. There it will be seen that one face of each conductor 31 defines alternate raised portions 41 and recesses 42 extending longitudinally along the conductor. Thus radial cooling conduits are defined at 40 between the conductor recessed portions 42 and the turn insulation 43. Recesses 42 can be mechanically or chemically produced in the face of conductors 31, and may suitably be formed by an upsetting or rolling operation. The exact shape is immaterial as long as alternate raised flat portions for bonding to the insulation 43 are separated by some sort of recesses 42. In FIG. 9, half of the conductors are shown facing in one direction and half in the other direction about a central conductor 44 with smooth faces. This conductor 44 may extend through to the bottom of slot 32 to divide the portion of the slot below the conductors into two longitudinal coolant chambers 45, 46. Thus the arrangement can provide for axial counterflow as indicated by arrows 47. Also the center conductor 44 can be inserted last after the bonded conductors on either side of it have been inserted. The size of chambers 45, 46 may also be arranged to decrease, moving in the direction of the flow arrows 47, so that a uniform outward flow of coolant through passages 40 is provided.

The arrangement shown in FIG. 5 is illustrated for the discharge portion of a gap pickup rotor, but a reversal of the flow arrows with suitable modification of wedge 35 makes the arrangement equally applicable for a pickup or intake portion.

FIG. 6 illustrates a modified slot cross-section suitable for a gas-cooled rotor of a lower rating than that of FIG. 5. The conductors 50 have a simple rectangular elongated cross-section, of a width-to-thickness ratio of at least 4 to 1 as before, or perhaps on the order of 10 to 1 or higher, and separated by turn insulation 51. The conductor package is bonded into a rectangular shape. Tapered spacer sections are made from longitudinal insulating spacer blocks 52 of a suitable material such as Textolite and L-shaped side plates 53 which may be of metal. Spacers 52 and side plates 53 may also be attached to one another by means of a suitable adhesive or resin such as the aforementioned epoxy resin, and inserted into the tapered slot 54 before the rectangular coil package is inserted. Spacers 52 and the side plates 53 convert the rectangular package into a tapered cross-section suitable for fitting in the upper portion of a tapered slot 54. It will be observed that the radially innermost corners of the conductor package bear against the heavier slot insulation 55 as indicated by the arrow 56. This causes the conductor package to define with the bottom of slot 54 a coolant passage 57 through which cooling gas may flow axially through the rotor. Thus the arrangement is suitable for a rotor fed from the end of the rotor body with cooling gas which flows either axially the length of the rotor or perhaps to the center of the rotor to be discharged to the air gap.

It will be observed that alternate conductors are made longer as indicated at 58 so as to extend into chamber 57. These extensions 58 act as cooling fins to promote turbulence and to increase the surface area exposed to the coolant in chamber 57. Note that the coolant is exposed to every conductor and that uniform cooling is thus promoted. Conductive heat exchange across the turn insulation 51 between individual conductors in the slot is far better in this arrangement than in a radially stacked coil. This is because only from one third to one half of the "normal" thickness of turn insulation is required, since this insulation is not subject to the cumulative crushing pressures due to centrifugal force of conductors "lower" in the slot. In a radially stacked coil, thicker turn insulation is required than is necessary for dielectric reasons, in order to obtain satisfactory mechanical resistance to high crushing stresses and differential thermal movements between layers in the coil. Secondly, the turn insulation area between adjacent conductors in the disclosed arrangement is about four or five times greater than for a radially stacked coil. Thus the thermal resistance between adjacent conductors in this arrangement is in the order of only one-eighth to one-fifteenth of that in the radially stacked case. As a result the temperature difference between conductors 50a with extensions 58 and the shorter alternate conductors 50b is every small, even though the area of extended conductors 50a exposed to cooling gas 57 is larger than for the 50b conductors. The very low thermal resistance laterally between conductors is conducive to heat flow to gas passages 157 alongside the coil as well, and this further reduces the coil temperature. Naturally, the arrangement of FIG. 6 does not provide the heat removal capability of the arrangement shown in FIG. 5, but this is offset somewhat by the simplicity of construction, making it desirable for rotors of lower rating in smaller machines.

FIG. 7 and FIG. 8 show arrangements suitable for liquid-cooled rotors. Arrangements are shown for two basic types of liquid-cooled rotors, i.e. the "flooded rotor," where the liquid circulates freely through the slots and outside the conductors and the "hollow conductor" type, where the liquid is confined to conduits within each conductor, and must be conveyed to the conductor by suitable conduits.

FIG. 7 illustrates an arrangement for a "flooded rotor." The presence of liquid in such a rotor increases tremendously the problems of leakage and additional stress imposed by the liquid. The latter may be controlled by using only a partial filling of liquid so that the liquid centrifuges to the radially outermost portions of the rotor. However, if this is done in a conventional radially stacked winding, only the radially outermost coils would be cooled. The edgewise wound construction is ideal for solving this problem, since the liquid may be in a relatively thin annular layer, yet have an equal effect on all conductors in the slot through conduction in the conductor copper.

In FIG. 7, the use of a flooded rotor is indicated symbolically by a liquid-tight circumferential sealing cylinder 60 and by a heavy backup ring 61. A slot wedge 62 retains the conductors 63 in the slot 64 which is insulated by a piece of slot insulation 65. Conductors 63 are bonded in a rectangular package having alternate layers of turn insulation 66 interposed between conductors. Conductors 63 are provided with axially spaced holes 67 and the insulation 66 is provided with holes 68. Holes 67 and 68 are preferably prepunched and arranged to be aligned when the members are bonded, although they can also be cut after the conductor package has been bonded. The radial location of holes 67, 68 is such that when the proper amount of liquid is in the rotor and the rotor is turning so as to centrifuge the liquid to the radially outermost portions, the gas-to-liquid interface 69 is approximately midway between the sides of holes 67, 68. Thus heat transfer within the liquid is by free convection and heat transfer along the conductors is by conduction in a radial direction along each conductor 63 to the portion of the conductor which is submerged in liquid. The liquid may be supplied to and withdrawn from the ends of the rotor by any suitable means. Axially spaced wedge-shaped spacers 70 serve to hold the rectangular package of conductors 63 in the slot. The spacers 70 are provided with axial ports 71 to allow axial movement of the liquid.

FIG 8 illustrates the edge-standing conductor as adapted for a liquid-cooled rotor having hollow or individually cooled conductors.. Here the conductors 75 are of slightly tapered cross-section and define longitudinally extending elongated internal conduits 76 for conducting the liquid. Conductors 75 are insulated from slot 77 by slot insulation 78 and by a creepage block 79. Wedges 80 serve to hold the conductors in the slot. Conductors 75 are bonded in three separate packages, as before, separated by turn insulation 81. Alternatively, the conductors could be of rectangular cross-section and bonded in a rectangular package. In this case, tapered spacer sections as in FIG. 6 would be employed.

It is to be particularly noted that the conduits 76 are all at the same radial location or distance from the rotor axis. This feature is particularly useful in reducing the pressure differentials which result when moving from one radial location to another in a liquid-cooled rotor. Since liquid is a very efficient heat exchange medium, the heat is rapidly transferred from the conductors 75 as the liquid flows in an axial direction. Although the liquid coolant is confined to one radial location in the rotor, it has an equal cooling effect on all of the conductors in the slot as with the previous modifications.

The means by which confinement of the liquid to one radial location results in a reduction of pressure differentials will become more clear by reference to FIGS. 10 and 11. Fig. 10 is a perspective view of a liquid supply manifold designed for placement at the center of the end turn coils. There the circumferentially extending portions of the end turn conductors are indicated at 84, 85. These correspond to the circumferentially extending portions 17, 17a in FIG. 1 and are provided with offset surfaces 86, 87 for joining to similar conductor cross-sections as were the members 17, 17a in FIG. 1. Circumferentially extending members 84, 85, however, are shortened slightly so as to accommodate a liquid manifold assembly at the center of the coils as indicated by the bracket 88. The location of manifold 88 if used on the rotor shown in FIG. 1, is indicated between the dot-dash lines. Manifold 88 is a pre-assembled, pre-tested package which is of sufficient axial length to join all of the coil end turn portions for one magnetic pole. In other words, a single manifold serves for several concentric coils. Each conductor defines an internal elongated conduit 76 as more particularly described in connection with FIG. 8.

The supply manifold 88 comprises edge-standing conducting members 89 alternating with insulating members 90. A supply pipe 91, attached to the last conductor 89a in the series winding by welding or brazing, defines a radially extending internal conduit 92 connecting with an axially extending conduit 93. Member 91 also defines an overflow conduit 94 so that centrifugal force on the liquid will establish a liquid interface at 95, the excess draining through port 94 as indicated by the arrow. Liquid entering through port 93 in an axial direction divides and flows circumferentially in both directions in conduits 76 as indicated by the dotted arrows 96.

A discharge manifold 98 similar to intake manifold 88 is similarly disposed at the centerline of the end turns on the opposite end of the rotor. This discharge manifold 98 is shown in FIG. 11, but instead of being shown in perspective, it is shown in cross-section to indicate the structure more clearly. Discharge manifold 98 is attached between the circumferentially extending portions of the end turns from matching coil halves at the other end of the rotor. A single such manifold 98 may serve all of the coils concentric about a single pole. The following description of the construction of discharge manifold 98 is equally applicable to the construction of the intake manifold 88.

Manifold 98 comprises spaced edge-standing conducting members 99 defining elongated internal conduits 76. Each of the conductors 99 also defines a hole 100 intersecting at right angles with conduit 76 so that conductors 99 can be aligned with holes 100 arranged to provide a conduit communicating with the conduits 76.

Acting as insulating spacing members between conductors 99 are blocks of a suitable ceramic 101 such as alumina and defining holes 102 aligned with holes 100. The ceramic blocks 101 are attached between conducting members 99 in a manner so as to form a liquid-tight seal. One method for doing this, according to a well-known technique, comprises the use of intermediate thin shims 103 which are of a suitable alloy such as Fernico, sold by General Electric Company, which is compatible with brazing both to copper and to ceramic. Additional security of the liquid seal is achieved through the use of backup blocks 104 of a laminated plastic insulating material such as Textolite and cut to fit around ceramic blocks 101.

Holes 100 and 102 cooperate to define an axial discharge conduit communicating with all of the conduits 76. It will be observed that on the outermost conductors 99a, 99b, the holes 100 do not extend all the way through. It should also be noted that on conductor 99a, a small discharge conduit 105 serves to meter the coolant flowing from the internal conduits. The liquid is discharged through port 105 and is thrown by centrifugal force to the inside of the retaining ring, whence it is drained off by suitable drainage conduits and thence collected by collecting rings, cooled and recirculated.

Port 105 should be located at a distance from the rotor axis only slightly greater than the distance of port 94 (see FIG. 10) from the rotor axis. This relative radial spacing between ports 94 and ports 105 creates the pressure difference serving to drive the liquid coolant through the passages 76. Since liquid is an efficient heat transfer medium, low velocities of flow and hence a relatively small pressure difference are all that is necessary. Likewise, it will be observed that the internal pressures due to the centrifugal force on the liquid are contained entirely within the internal conduits 76 and the seal manifold axial passages. Furthermore, the maximum liquid centrifugal pressure is held to a very modest value determined by the radial liquid depth from the outside of the passages 76 to radius of overflow hole 94. If the conductors were stacked radially the liquid would have to extend radially over at least the depth from the passage in the outer layer to the passage in the inner layer in order to cool all conductors. The internal pressures tending to cause leaks would be four to eight times those of my arrangement. Thus, maximum security against leakage is provided.

The operation of my improved edge-standing rotor winding will now be described. The disposition and shape of the conductors suit them ideally for various types of conductor cooling. First the radial disposition in the slots and in the end turn portions with each conductor extending the full radial distance inherently means that a coolant, be it liquid or gas, introduced to flow longitudinally along the rotor in a specific radial zone can be exposed to every conductor in the slot, the heat being removed from this radial zone by means of radial conduction along the conductor. This removes the necessity for providing conduits for transfer of the coolant from one radial location to another in order to come in contact with all conductors of the slot. This radial transfer problem becomes acute where liquid-cooled rotors are concerned, due to the great pressure change in moving from one radial location to another. FIGS. 5–8 illustrate this principle showing that a single passage or group of passages in a given radial location are in thermal contact with all the conductors. Chambers 45, 46 in FIG. 5, chamber 57 in FIG. 6, the centrifuged liquid layer in FIG. 7, and the internal passages 76 in FIG. 8 furnish examples of these passages at a single radial location cooling all the conductors in the slot.

A second important advantage of edge-standing conductors is due to the large ratio of width to thickness which is obtainable. As is well known, a cross-section in the shape of greatly elongated thin rectangle such as found in a plate has a much greater ability to dissipate heat than has a square cross-section such as in a bar. This characteristic, although used advantageously in the slot section shown in FIG. 5, becomes particularly advantageous in the end turn portions of the rotor. The end turns are often cooled by free convection of the coolant inside the retaining ring circulating around the surface area of the conductors. Such free convection end turn cooling is particularly efficient when using edge-standing conductors as may be seen by FIG. 1. Thus where coolant may circulate radially between the conductor bars, a large surface area of conductor is exposed with rapid dissipation of heat to the coolant. Such high width-to-thickness ratios of conductors of as high as 450 to 1 are simply not obtainable in radially stacked conductors of the prior art since the width of the bar is limited by the width of the slot and a certain minimum thickness of the conductor is a necessity. Moreover, in the end turns of conventional radially stacked conductors, the flat sides of the conductors are stacked upon one another with only the edges exposed, whereas in the present arrangement, the large flat surfaces of the conductors are exposed for the most efficient heat transfer.

A third important advantage is that heat equalization by conduction through the thin insulation is greatly improved due to (1) larger surface area exposed between conductors since the conductor width is no longer limited to the slot width, and (2) thinner turn insulation since mechanical crushing need not be considered.

The method of bonding the conductors into a prebent package for insertion into a winding slot as a coil-half unit greatly simplifies the assembly of the rotor. Such bonding insures that the package of conductors behaves as a unit and removes any possibility of buckling due to the compressive stresses in a radial direction. The half-coil packages for a complete pole portion of the rotor may be inserted and the circumferentially extending end turn portions brazed or otherwise joined in a single operation by inserting flat plate heaters between the conductors in the location shown by blocks 20 in FIG. 1, compressing the end turns axially while the brazing is performed, and later removing the heaters and substituting insulating blocks 20 therefor. Such a procedure greatly simplifies the winding of a rotor over previous methods.

The use of edgewise standing conductors also permits the end turns to be easily reduced in cross-section and their radius reduced, all conductors being cut down by an equal amount so as to either permit the use of a smaller diameter retaining ring with lower stresses or to permit the use of a larger rotor body diameter for a previous size retaining ring.

It will also be observed that there are no radial transitions necessary in the coil-to-coil or layer-to-layer connections to complicate the end windings as in a conventional radially stacked coil.

The conductor depth can be deeply notched without a large loss in electrical cross-section. This provides space for brazed connections to the face of the conductors for liquid pipes such as the supply conduit 91 in FIG. 10 or notches or holes for carrying ventilating gas or liquid crosswise through the stack of conductors as conduit 39 in FIG. 5 or as holes 67 in FIG. 7. Also, this permits insulated bolts to be used in lieu of brazing the end turns together.

The windings of a rotor as they are heated undergo thermal expansion relative to the rotor slots. If the center of the end turns is restrained such as required by a liquid manifold or for other reasons, the end turns will be subjected to bending stresses due to the force emanating from the coils expanding out from the slots. With radially stacked conductors, the resistance to bending in the plane of the conductor width is relatively high. With edge-standing conductors, on the other hand, the bending force is normal to the conductor width and great flexibility is afforded by means of this arrangement. Thus the edge-standing conductor flexes to allow for thermal expansion of the slot-lying portions of the conductors.

Numerous other modifications and substitutions of equivalents will occur to those acquainted with the art; and it is of course intended to cover by the appended claims all such modifications as fall within the true spirit and scope of the invention.

What I claim as new and desire to secure by Letters Patent of the United States is:

1. A wound magnetic core comprising a core defining slots therein, a winding for said slots comprising a strip of electrically conductive material having a length greater than the core slot length, a width greater than the slot transverse dimension and only slightly less than the slot depth, and a mean thickness less than one-tenth of the strip width, the strip being disposed on edge in the slot together with similar strips to comprise an edge-standing slot group, the strips of said slot group being electrically connected in series with strips of other slot groups to form a rotor winding, each of said strips in each slot group defining exposed uninsulated surfaces at substantially the same depth in the slot, whereby a coolant fluid circulated at said depth will come in contact with all of the strips in the slot.

2. A dynamoelectric machine rotor comprising a rotor body defining a plurality of longitudinal circumferentially spaced radially extending winding slots, a winding for said slots comprising a strip of electrically conductive material having a length greater than said slot length, a width greater than the slot circumferential dimension and only slightly less than the slot radial dimension, and a mean thickness less than one-fourth of the strip width, the strip being disposed on edge in said slot together with similar strips to form an edge-standing slot group, the strips of said slot group being electrically connected in series with strips of other slot groups to form a rotor winding, each of said strips in each slot group defining exposed uninsulated surfaces at substantially the same radial depth in the slot, whereby a coolant fluid circulated at said radial depth will come in contact with all of the strips in the slot.

3. A rotor winding according to claim 2 wherein the ends of said strip in excess of the rotor slot length define elongated notches along one edge of the strip at either end thereof to provide end portions of reduced width at either end of the rotor slot.

4. A rotor winding according to claim 2 wherein said end portions are bent at substantially right angles to the strip width and wherein the edges of said bent portions define arcs of substantially constant radius.

5. A rotor winding according to claim 2 which defines at least one internal longitudinally extending conduit with a cross-section which is elongated in the direction of the strip width.

6. A rotor winding according to claim 2 wherein at least one face of said strip defines longitudinally spaced recesses extending across the width of the conductor from one edge to the other.

7. A winding sub-assembly for a dynamoelectric machine rotor defining a plurality of longitudinal circumferentially spaced radially extending slots comprising a plurality of strips of conductive material having a width greater than the circumferential dimension of said rotor slot and only slightly less than the radial depth of said slot, a plurality of flat insulating strips of a width substantially equal to that of said conducting strips interposed between and bonded to the conducting strips to provide a laminated sub-assembly for insertion as a unit into a said rotor slot, each of said strips defining exposed uninsulated surfaces at substantially the same depth in the slot, whereby a coolant fluid circulated at said depth will come in contact with all of the strips in the slot.

8. The combination according to claim 7 wherein the conducting strips are of a length greater than said slot length and wherein said insulating strips are bonded to said conducting strips only in the central portion thereof leaving unbonded end portions, said end portions of the conducting strips being bent at right angles to the strip width so as to define spaces between the bent portions, said bent portions also defining arcs along their edges of substantially constant radius.

9. The combination according to claim 7 wherein the conducting strips are of a length greater than said slot length and wherein said insulating strips are bonded to the conducting strips only along the central portion thereof leaving unbonded end portions, each said end portion defining an elongated notch along one side of the strip so as to reduce the width of the end portions of said conducting strips, whereby the radial dimension of the winding will be less on the ends than in the central portion.

10. A dynamoelectric machine rotor comprising a cylindrical central rotor body defining a plurality of longitudinal circumferentially spaced radially extending winding slots and having spindle end portions of lesser diameter than the body, a winding for the rotor comprising a plurality of serially connected conducting members having slot-lying portions disposed in said slots and connecting end turn portions extending circumferentially at the end of the rotor body, the slot-lying portions of said conducting members having an elongated cross-section with a transverse dimension greater than the rotor slot width and disposed in the slot with said transverse dimension lying substantially in a radial direction, and conduit means in each slot at substantially the same distance from the rotor axis conducting coolant fluid in contact with each conductor in the slot at one radial portion of the slot.

11. The combination according to claim 10 wherein said end turn portions are also of an elongated cross-section with the greatest transverse dimension lying substantially radially and wherein said end turn portions are axially spaced to expose the sides of the end portions having the greatest transverse dimension.

12. The combination according to claim 10 wherein said conduit means comprises a longitudinally extending chamber radially inward from the conductor inner edges and defined between the conductors and the bottom of the slot.

13. The combination according to claim 10 wherein said conduit means comprises a longitudinally extending chamber lying radially inward from the conductors and defined between the conductors and the bottom of the slot, and wherein spaced conductors extend into said chamber radially inward beyond other conductors to provide additional heat transfer surface.

14. The combination according to claim 10 wherein said conduit means comprises a longitudinally extending chamber lying radially inward from the conductors and defined between the conductors and the bottom of the slot, and wherein at least one radial face of each conductor defines axially spaced recesses extending radially from one edge of the conductor to the other.

15. The combination according to claim 10 including liquid-tight means enclosing the rotor body portion, a quantity of liquid in said rotor and only partially filling said slots, whereby centrifugal force will cause the liquid to centrifuge to the tops of the slots and define a liquid interface near the top of the slot, and wherein said conduit means comprises circumferentially extending holes defined by the conductors in the slot and providing a passage containing said liquid interface.

16. The combination according to claim 10 wherein said conduit means comprises longitudinally extending elongated internal conduits defined by the conductors, each being at the same radial position in the slot, and means to supply and discharge liquid to said internal conduits at said radial location so as to reduce pressure differentials in the liquid.

17. A liquid manifold for liquid-cooling a rotor with edge-standing conducting members comprising a plurality of conducting members having elongated cross-sections with a width-to-thickness ratio of at least four to one and defining internal longitudinally extending conduits therein, a plurality of insulating spacer members interposed between said conducting members and bonded thereto in leak-tight relationship, said conducting members and said spacer members together defining a common conduit intersecting all of said conductor internal conduits for the supply and discharge to the conductors of a liquid coolant.

References Cited in the file of this patent

UNITED STATES PATENTS

| | | |
|---|---|---|
| 2,384,489 | Pancher | Sept. 11, 1945 |
| 2,728,001 | Gunthardt | Dec. 20, 1955 |
| 2,760,091 | Barlow | Aug. 1, 1956 |
| 2,996,791 | Hicks | Aug. 22, 1961 |

FOREIGN PATENTS

| | | |
|---|---|---|
| 340,690 | Great Britain | Jan. 8, 1931 |
| 341,166 | Great Britain | Jan. 15, 1931 |